(12) United States Patent
Hoffmann et al.

(10) Patent No.: US 8,699,181 B2
(45) Date of Patent: Apr. 15, 2014

(54) SPINDLE MOTOR FOR DRIVING A HARD DISK DRIVE

(75) Inventors: Joerg Hoffmann, Villingen-Schwenningen (DE); Olaf Winterhalter, Epfendorf (DE); Markus Loehr, Brigachtal (DE)

(73) Assignee: Minebea Co., Ltd., Nagano-Ken (JP)

( * ) Notice: Subject to any disclaimer, the term of this patent is extended or adjusted under 35 U.S.C. 154(b) by 300 days.

(21) Appl. No.: 13/316,893

(22) Filed: Dec. 12, 2011

(65) Prior Publication Data

US 2012/0162820 A1 Jun. 28, 2012

(30) Foreign Application Priority Data

Dec. 22, 2010 (DE) .................. 10 2010 055 739

(51) Int. Cl.
*G11B 5/39* (2006.01)
(52) U.S. Cl.
USPC ..................................... 360/99.12
(58) Field of Classification Search
USPC ..................................... 360/99.12
See application file for complete search history.

(56) References Cited

U.S. PATENT DOCUMENTS

| 6,447,167 | B1 | 9/2002 | Kashiwada | |
| 8,477,449 | B2 * | 7/2013 | Choi | 360/97.11 |

FOREIGN PATENT DOCUMENTS

| DE | 20021037848 | 8/2002 |
| DE | 10297432 | 2/2005 |
| DE | 200810057551 | 11/2008 |
| WO | 03044790 | 5/2003 |

* cited by examiner

*Primary Examiner* — Mark Blouin
(74) *Attorney, Agent, or Firm* — Cooper & Dunham LLP

(57) ABSTRACT

The invention relates to a spindle motor, preferably for driving a hard disk drive, having a stationary motor component and a rotatable motor component that is rotatably supported with respect to the stationary motor component and that is driven by an electromagnetic drive system, at least one storage disk being fixed to the rotatable motor component using some means of mounting and fastening. According to the invention, at least parts of the rotatable motor component and at least parts of the means of mounting and fastening have a wear resistant surface coating or are subjected to a wear resistant surface treatment.

20 Claims, 2 Drawing Sheets

SPINDLE MOTOR FOR DRIVING A HARD DISK DRIVE

BACKGROUND OF THE INVENTION

The invention relates to a spindle motor for driving a hard disk drive having a stationary motor component and a rotatable motor component that is rotatably supported with respect to the stationary component and that is driven by an electromagnetic drive system. At least one storage disk is fixed to the rotatable motor component using some means of mounting and fastening.

PRIOR ART

Modern spindle motors for driving hard disk drives comprise fluid dynamic bearing systems for the rotatable support of the rotating motor components. The motor generally includes a shaft that is rotatably supported in a bearing bush by means of the fluid dynamic bearing. In order to reduce bearing friction it is known to harden the bearing components, particularly the shaft and the bearing bush, or to provide these components with a wear resistant surface coating. For this purpose, such coatings as DLC (diamond-like carbon) coatings or nickel coatings are used. This makes it possible to reduce wear to the bearing surfaces caused by friction.

In the manufacture of spindle motors or hard disk drives, very strict requirements are placed on cleanliness, which is crucial with regard to organic and non-organic particles. A mere dust particle on the storage disk of the hard disk drive may damage the hard disk drive or even disable it. Therefore components for hard disk drives are accordingly cleaned very carefully and selected and assembled under clean room conditions in order to comply with cleanliness standards. The same applies for the necessary work equipment.

A problem arises, however, at the final assembly stage of the hard disk drives, particularly when mounting the storage disks onto the hub of the spindle motor using the required mounting and fastening means. During this mounting operation, there is a high risk of the components coming into metal-to-metal contact thus causing the abrasion of metal particles that contaminate the components and that consequently result in damage when the hard disk drive is put into operation. This kind of particle abrasion is difficult to detect and accordingly expensive to eliminate through cleaning.

Damage to the components during their transport to the assembly device may also be problematic. Should the components fall down or come into contact with other objects, this could cause dents, scratches and material wear, for example, by knocking the components when being inserted into the mounting device or when the components are laid onto a hard table top, etc. One remedy here is to raise employee awareness with regard to the proper handling of the components, for example, by covering all possible danger spots at the workplace, such as by sheathing equipment in plastics or through the use of soft plastic matting, etc. Even so, defects or material wear to the parts to be mounted can never be totally eliminated.

Components made of relatively soft materials such as aluminum are particularly susceptible. It is often not possible to use another, less sensitive material. Moreover, it is exactly these components and surfaces, such as the supporting surfaces of the hub for the storage disks, etc. that need to be especially defect free and precisely machined, since they have to satisfy the strict requirements of a visual inspection.

SUMMARY OF THE INVENTION

It is the object of the invention to provide a spindle motor in which the risk of contamination through particles during assembly is reduced.

The spindle motor comprises a stationary motor component and a rotatable motor component that is rotatably supported with respect to the stationary motor component and driven by an electromagnetic drive system, at least one storage disk being fixed to the rotatable motor component using some means of mounting and fastening.

According to the invention, at least parts of the rotatable motor components and at least parts of the means of mounting and fastening have a wear resistant surface coating or are subjected to a wear resistant surface treatment.

Preferred embodiments of the invention and further characteristics relating to the invention are described in the claims and the following description.

Even if the components, such as the hub of the rotatable motor component and the means of mounting and fastening for the storage disk, are themselves not subject to any frictional wear with a contact partner during operation, it could still be expedient according to the invention to provide the surfaces of these components, completely or selectively, with a thin but sufficiently thick wear reducing coating. In particular, all components that are transported or mounted in the course of the final assembly stage should be provided with such a surface treatment. This applies particularly to the spacers and retaining clamps for mounting the storage disks as well as the hub of the motor itself or respectively the motor flange and the baseplate, which may preferably be given such a coating. On the hub, these are particularly the highly sensitive and critical surfaces such as the supporting surfaces for the storage disks or the skin surface.

The surface coating can take a DLC coating or a nickel coating. These hard coatings can then be subsequently treated by mechanical means, such as brushing or plasma treatment. The standard coating thickness for DLC coatings is 2 μm if the coated components are subject to frictional forces when the bearing is in operation. In order to reduce susceptibility to scratching during the mounting process, according to the invention significantly thinner coating thicknesses of, for example, 0.5 μm suffice. This goes to hinder damage, mainly scratching, during the assembly and transport of the components to be mounted and also during the manufacturing process, thus reducing rejects.

The kinds of protection that are particularly suitable are coatings, such as DLC coatings, but also protective varnishes or other surface treatments, such as surface hardening of steel components. It is important that the protective coatings be applied sufficiently homogeneously and thinly. Clean room requirements and the specifications of the components of the spindle motors and hard disks must also be complied with.

Alongside protection from damage during the transport and assembly of the components, this kind of protective coating or wear resistant coating may make it easier to satisfy cosmetic requirements.

Through the appropriate choice of color for the protective coatings, commensurate with the roughness values or other coating properties, this kind of surface treatment may be helpful in detecting defects on the parts. Making the smallest defects visible will help improve the final inspection of the components. Taking a DLC coating as an example, the surface of the coated parts is black after coating which goes to make defects under this coating easier to see.

According to the invention, not only the components to be transported or assembled may be provided with this kind of surface treatment, but also the corresponding assembly equipment and tools. If the assembly equipment and tools are provided with a wear resistant coating and surface treatment, this would also reduce the risk of creating abraded particles.

But also the stationary motor component, particularly the baseplate of the spindle motor, may be provided with a surface coating or surface treatment. This baseplate forms a large part of the housing of the hard disk drive, so that again here abraded particles could be produced during assembly, which would be largely prevented by the surface coating.

Preferred embodiments of the invention are described in more detail below on the basis of the drawings. Further characteristics and advantages of the invention can be derived from the drawings and their description.

DESCRIPTION OF PREFERRED EMBODIMENTS OF THE INVENTION

Figure 1:
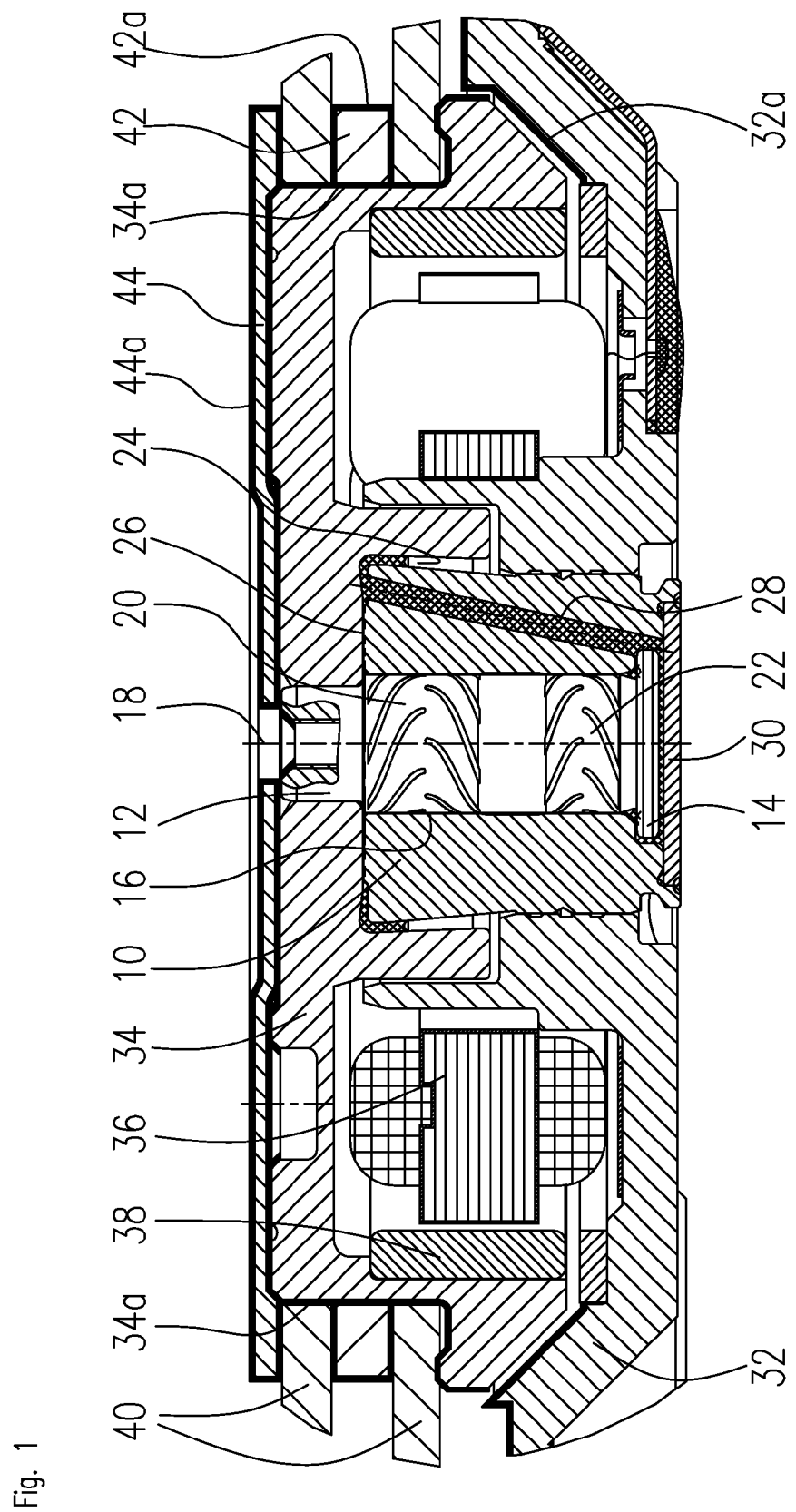
FIG. 1: shows a section through a spindle motor for driving the storage disks of a hard disk drive in a first embodiment.

FIG. 1 shows a longitudinal section through a spindle motor having a fluid dynamic bearing system as is used for driving hard disk drives. The spindle motor comprises a stationary bearing bush 10 that has a central bore and forms the stationary component of the bearing system. A shaft 12 is set into the bore of the bearing bush 10 whose diameter is slightly smaller than the diameter of the bore. A bearing gap 16 that is filled with a suitable bearing fluid, such as a bearing oil, remains between the surfaces of the bearing bush 10 and of the shaft 12. The mutually opposing surfaces of the shaft 12 and the bearing bush 10 form two fluid dynamic radial bearings 20, 22 by means of which the shaft 12 is supported in the bearing bush 10 rotatable about a rotational axis 18. The radial bearings 20, 22 are marked in a well-known manner by grooved bearing patterns that are provided on the surface of the shaft 12 and/or of the bearing bush 10. On rotation of the shaft 12, the grooved bearing patterns of the radial bearings 20, 22 exert a pumping effect on the bearing fluid located in the bearing gap 16 between the shaft 12 and the bearing bush 10. This causes pressure to be built up in the bearing gap that gives the radial bearings 20, 22 their load-carrying capacity. On the underside of the shaft 12, a stopper ring 14 is disposed that is formed integrally with the shaft or as a separate piece and that has an enlarged outside diameter compared to the diameter of the shaft. The stopper ring 14 is loosely held in a recess in the bearing bush and prevents the shaft 12 from falling out of the bearing bush 10. The bearing is closed at this side of the bearing bush 10 by a cover plate 30.

A free end of the shaft 12 is connected to a hub 34 that partially encloses the bearing bush 10. A lower, planar surface of the hub 34, together with an end face of the bearing bush 10, forms a fluid dynamic axial bearing 26. The end face of the bearing bush 10 or the opposing surface of the hub 34 is provided with a grooved bearing pattern that, on rotation of the shaft 12, exerts a pumping effect on the bearing fluid located in the bearing gap 16 between the rotor component 34 and the end face of the bearing bush 10, thus giving the axial bearing 26 its load-carrying capacity. The bearing gap 16 comprises an axial section that extends along the shaft 12 and the two radial bearings 20, 22, and a radial section that extends along the end face of the bearing bush 10 and the axial bearing 26. At the radially outer end of the radial section of the bearing gap 16, a gap having a larger gap distance is disposed that partly acts as a sealing gap 24. Starting from the bearing gap 16, the gap extends radially outwards and merges into an axial section that extends along the outside circumference of the bearing bush 10 between the bearing bush 10 and the hub 34 and forms the sealing gap 24.

In the bearing bush 10, a recirculation channel 28 is provided that connects together a section of the bearing gap 16 located at the outer edge of the axial bearing 26 to a section of the bearing gap 16 located below the lower radial bearing 22 and supports circulation of bearing fluid in the bearing.

A stator arrangement 36 is disposed on the baseplate, the stator arrangement 36, together with a rotor magnet 38 fixed to the rotor component, forming the electromagnetic drive system of the spindle motor.

The bearing bush 10 is largely held in a baseplate 32 of the spindle motor. At its outside circumference, the hub 34 has a circumferential rim. When the spindle motor is used for driving a hard disk drive, one or more storage disks 40 are disposed on this circumferential rim. In the drawing, two storage disks are illustrated that are axially separated from one another by a spacer 42. The arrangement of the storage disks is fixed by a retaining clamp 44 that is screwed centrally to the shaft 12 and that presses onto the upper storage disk 40.

According to the invention, several components of the spindle motor are provided with a wear resistant surface coating or surface treatment. The hub 34 in particular has a surface coating 34a at its outside circumference as well as on the contact surface for the storage disks 40. Likewise, the hub 34 is provided with a surface coating 34a on the supporting surface for the retaining clamp 44.

The spacer 42, which is annular in shape and keeps the two storage disks 40 axially separated from one another, is also provided with a surface coating 42a. The retaining clamp 44 is likewise preferably provided with a surface coating 44a on its entire surface.

As an option, the baseplate 32 may be provided with a surface coating 32a on the surface lying opposite the hub.

Figure 2:
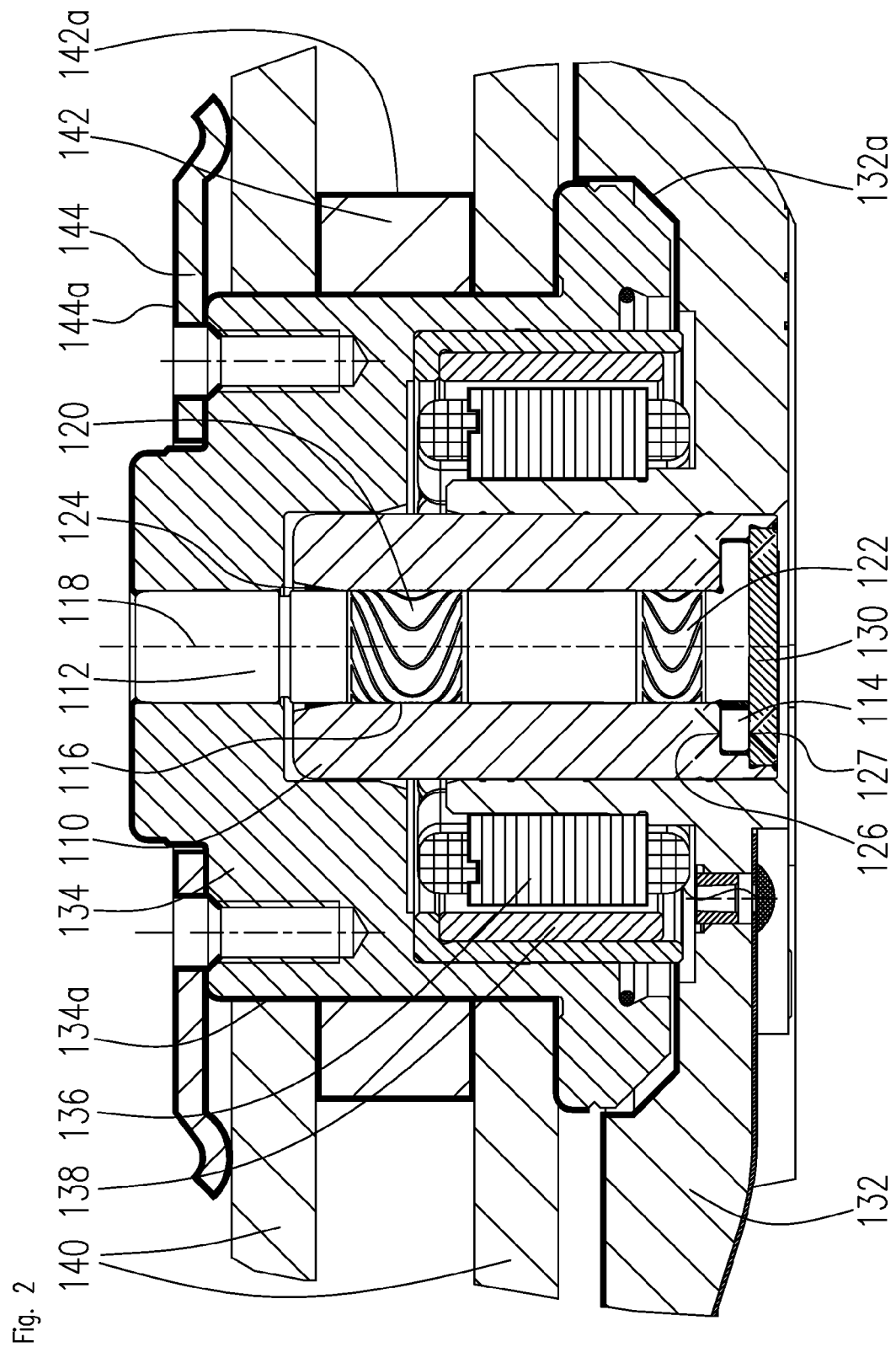
FIG. 2: shows a section through a spindle motor for driving the hard disks of a hard disk drive in a second embodiment.

FIG. 2 shows another well-known design for a spindle motor having a fluid dynamic bearing. The spindle motor comprises a stationary baseplate 132 on which a stator arrangement 136, consisting of a stator core and windings, is disposed. A bearing bush 110 is held in a recess in the baseplate 132 and has an axial cylindrical bore in which a shaft 112 is inserted so as to be rotatable about a rotational axis 118. The free end of the shaft 112 carries a hub 134 on which one or more storage disks 140 of a hard disk drive are disposed and fixed. The storage disks 140 are separated axially from one another by a spacer 142 and are fixed to the hub 134 by an elastic spring retaining clamp 144.

On the inner, lower rim of the hub 134, an annular permanent magnet 138 having a plurality of pole pairs is disposed that is supplied with an alternating electric field by a stator arrangement 136 separated from it by an air gap, so that the hub 134 together with the shaft 112 is set in rotation.

The shaft 112, together with a thrust plate 114 fixed to the shaft and the bearing bush 110, forms a hydrodynamic bearing arrangement. The bearing arrangement is covered from below by a cover plate 130. Between the surfaces of the bearing bush 110, the thrust plate 114 and the shaft 112 there remains a bearing gap 116 that is filled with a suitable bearing fluid, such as a bearing oil. The mutually opposing surfaces of the shaft 112 and the bearing bush 110 form two fluid dynamic radial bearings 120, 122 that are marked in a well-known manner by grooved bearing patterns that are provided on the surface of the shaft 112 and/or of the bearing bush 110. The thrust plate 114 is disposed at one end of the shaft 112 that is disposed in the bearing bush 110 and, together with an opposing step of the bearing bush 110 and the cover plate 130, forms two fluid dynamic axial bearings 126, 127 working against each other. The end faces of the thrust plate 114 are preferably provided with grooved bearing patterns that, on rotation of the shaft 112, exert a pumping effect on the bearing fluid located in the bearing gap 116 between the thrust plate 114, the bearing bush 110 and the cover plate 130, thus giving the axial bearings 126, 127 their load-carrying capacity. The open end of the bearing gap 116 is sealed by a capillary sealing gap 124.

According to the invention, partial surfaces of the hub 134 and the baseplate 132 as well as the means of mounting and fastening 142, 144 for the storage disks are provided with a surface coating. More specifically, it is the outside regions of the hub 134 as well as the supporting surfaces for the storage disks 140 that are provided with a coating 134a. The spacer 142 and the retaining clamp 144 are also provided with surface coatings 142a or 144a. Moreover, regions of the baseplate 132 may also be surface coated 132a.

For the sake of clarity, the surface coatings are shown as bold lines of exaggerated thickness in the drawing. Generally the coatings are only fractions of micrometers thick, at the most up to a few micrometers.

IDENTIFICATION REFERENCE LIST 10, 110 Bearing bush
12, 112 Shaft
14 Stopper ring
114 Thrust plate
16, 116 Bearing gap
18, 118 Rotational axis
20, 120 Radial bearing
22, 122 Radial bearing
24, 124 Sealing gap
26, 126 Axial bearing
127 Axial bearing
28 Recirculation channel
30, 130 Cover plate
32, 132 Baseplate
32a, 132a Surface coating
34, 134 Hub
34a, 134a Surface coating
36, 136 Stator arrangement
38, 138 Rotor magnet
40, 140 Storage disk
42, 142 Spacer
42a, 142a Surface coating
44, 144 Retaining clamp
44a, 144a Surface coating

The invention claimed is:

1. A spindle motor for driving a hard disk drive having a stationary motor component (10, 32; 110, 132) and a rotatable motor component (12, 34; 112; 134) that is rotatably supported with respect to the stationary motor component and that is driven by an electromagnetic drive system (36, 38; 136, 138), at least one storage disk (40, 140) being fixed to the rotatable motor component using means of mounting and fastening (42, 44; 142, 144), wherein at least parts (34; 134) of the rotatable motor component and at least parts of the means of mounting and fastening (42, 44; 142, 144) have a wear resistant surface coating (34a, 42a, 44a; 134a, 142a, 144a) or are subjected to a wear resistant surface treatment.

2. A spindle motor according to claim 1, wherein the rotatable motor component comprises a hub (34; 134).

3. A spindle motor according to claim 1, wherein the means of mounting and fastening comprise spacers (42; 142) and retaining clamps (44; 144).

4. A spindle motor according to claim 1, wherein at least parts (32; 132) of the stationary motor component have a wear resistant surface coating (32a; 132a) or are subjected to a wear resistant surface treatment.

5. A spindle motor according to claim 1, wherein the stationary motor component comprises a baseplate (32; 132).

6. A spindle motor according to claim 1, wherein the wear resistant surface coating is a DLC coating.

7. A spindle motor according to claim 1, wherein the wear resistant surface coating is a nickel coating.

8. A spindle motor according to claim 1, wherein the wear resistant surface coating is a protective varnish.

9. A spindle motor according to claim 1, wherein the wear resistant surface treatment is a surface hardening.

10. A spindle motor according to claim 1, wherein the wear resistant surface treatment additionally comprises a mechanical, chemical or plasma treatment.

11. A hard disk drive, driven by a spindle motor having a stationary motor component (10, 32; 110, 132) and a rotatable motor component (12, 34; 112; 134) that is rotatably supported with respect to the stationary motor component and that is driven by an electromagnetic drive system (36, 38; 136, 138), at least one storage disk (40, 140) being fixed to the rotatable motor component using some means of mounting and fastening (42, 44; 142, 144) and a read/write device for reading and writing data from and to the storage disk (40; 140), wherein at least parts (34; 134) of the rotatable motor component and at least parts of the means of mounting and fastening (42, 44; 142, 144) have a wear resistant surface coating (34a, 42a, 44a; 134a, 142a, 144a) or are subjected to a wear resistant surface treatment.

12. A hard disk drive according to claim 11, wherein the rotatable motor component comprises a hub (34; 134).

13. A hard disk drive according to claim 11, wherein the means of mounting and fastening comprise spacers (42; 142) and retaining clamps (44; 144).

14. A hard disk drive according to claim 11, wherein at least parts (32; 132) of the stationary motor component have a wear resistant surface coating (32a; 132a) or are subjected to a wear resistant surface treatment.

15. A hard disk drive according to claim 11, wherein the stationary motor component comprises a baseplate (32; 132).

16. A hard disk drive according to claim 11, wherein the wear resistant surface coating is a DLC coating.

17. A hard disk drive according to claim 11, wherein the wear resistant surface coating is a nickel coating.

18. A hard disk drive according to claim 11, wherein the wear resistant surface coating is a protective varnish.

19. A hard disk drive according to claim 11, wherein the wear resistant surface treatment comprises surface hardening.

20. A hard disk drive according to claim 11, wherein the wear resistant surface treatment additionally comprises a mechanical, chemical or plasma treatment.

* * * * *